(12) United States Patent
Geerlings et al.

(10) Patent No.: US 11,646,797 B2
(45) Date of Patent: May 9, 2023

(54) INTEGRAL COMMUNICATION ACCESS IN TRAINABLE TRANSCEIVER

(71) Applicant: GENTEX CORPORATION, Zeeland, MI (US)

(72) Inventors: Steven L. Geerlings, Holland, MI (US); Thomas S. Wright, Holland, MI (US); Brock R. Rycenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/698,006

(22) Filed: Mar. 18, 2022

(65) Prior Publication Data

US 2022/0321222 A1 Oct. 6, 2022

Related U.S. Application Data

(60) Provisional application No. 63/168,455, filed on Mar. 31, 2021.

(51) Int. Cl.
| | | |
|---|---|---|
| *H04B 10/40* | (2013.01) | |
| *H04B 5/00* | (2006.01) | |
| *H04B 10/116* | (2013.01) | |
| *H04B 10/50* | (2013.01) | |

(52) U.S. Cl.
CPC ........... *H04B 10/40* (2013.01); *H04B 5/0031* (2013.01); *H04B 10/116* (2013.01); *H04B 10/502* (2013.01)

(58) Field of Classification Search
CPC .... H04B 10/40; H04B 10/116; H04B 10/502; H04B 5/0031
USPC ........................................................ 398/135
See application file for complete search history.

(56) References Cited

U.S. PATENT DOCUMENTS

| 9,858,808 B2 * | 1/2018 | Geerlings .............. G08C 17/02 |
|---|---|---|
| 2009/0072526 A1 | 3/2009 | Peters et al. |
| 2012/0069444 A1 * | 3/2012 | Campbell .............. B60Q 3/258 |
| | | 359/630 |
| 2012/0303323 A1 | 11/2012 | Ha et al. |

(Continued)

OTHER PUBLICATIONS

International Search Report dated Jul. 4, 2022, for corresponding PCT application No. PCTUS2022/ 020848, 5 pages.

(Continued)

*Primary Examiner* — Dalzid E Singh

(74) *Attorney, Agent, or Firm* — Price Heneveld LLP; Brian James Brewer

(57) ABSTRACT

A trainable transceiver may comprise an electro-optic element comprising a first substrate having an electrode coating on a surface; a second substrate generally parallel to and in a spaced-apart relationship with the first substrate and having an electrode coating on a surface; and a window in at least one of the first substrate and the second substrate from which the electrode coating has been at least partially removed. The trainable transceiver may also comprise a machine-readable optical image selectively visible through the window; a light source disposed in proximity to the machine-readable optical image; and a controller capable of controlling the light source. Upon receipt of an appropriate input, the controller causes the activation of the light source which, in turn, causes the machine-readable optical image to be visible through the electro-optic element.

16 Claims, 5 Drawing Sheets

(56) References Cited

U.S. PATENT DOCUMENTS

| | | | |
|---|---|---|---|
| 2013/0068673 A1 | 3/2013 | Maggiore et al. | |
| 2015/0302732 A1* | 10/2015 | Wright | H04N 21/42204 |
| | | | 340/5.25 |
| 2015/0302735 A1* | 10/2015 | Geerlings | G08C 17/02 |
| | | | 340/5.25 |
| 2015/0325113 A1* | 11/2015 | Geerlings | G07C 9/0069 |
| | | | 340/5.25 |
| 2016/0203721 A1* | 7/2016 | Wright | B62D 15/027 |
| | | | 348/118 |
| 2017/0079082 A1* | 3/2017 | Papay | H04W 4/70 |
| 2019/0049810 A1 | 2/2019 | Geerlings et al. | |
| 2020/0234567 A1 | 7/2020 | Geerlings et al. | |
| 2021/0370877 A1* | 12/2021 | Peterson | B60R 16/023 |

OTHER PUBLICATIONS

Written Opinion dated Jul. 4, 2022, for corresponding PCT application No. PCT/US2022/020848, 6 pages.

\* cited by examiner

INTEGRAL COMMUNICATION ACCESS IN TRAINABLE TRANSCEIVER

CROSS REFERENCE TO RELATED APPLICATIONS

This application claims the benefit of and priority to U.S. Provisional Patent Application No. 63/168,455, filed on Mar. 31, 2021, entitled Integral Communication Access in Trainable Transceiver, the entire disclosure of which is hereby incorporated herein by reference.

FIELD OF THE DISCLOSURE

This disclosure relates generally to trainable transceivers, and in particular, to accessing information from trainable transceivers.

BACKGROUND

Trainable transceivers are an increasingly popular convenience. The trainable transceivers may be used to remotely operate devices. For example, trainable transceivers in vehicles may be used to remotely operate devices outside the vehicle, such as moveable barrier systems, thermostats, interior and/or exterior lights, and the like. In many vehicles, the trainable transceiver may be associated with a rearview assembly.

The trainable transceivers may need to be trained prior to being used. The training process may differ from vehicle to vehicle. Training instructions and videos are generally available on the internet. However, it may be time-consuming to find the proper instructions and/or video.

Currently, access to training information associated with a vehicle trainable transceiver may be accessed by scanning a machine-readable optical image containing information such as a quick response (QR) code or a bar code. The machine-readable optical image may direct a user to an internet site or other location. The internet site or other location may contain instructions and/or video illustrating how to train the trainable transceiver.

The machine-readable optical image may be in the form of a sticker or other device. The sticker containing the machine-readable optical image may be applied to an exterior surface of the rearview assembly or it may be in another location such as in a vehicle owners' manual. However, the stickers on the rearview assemblies may fall off or become displaced, and the stickers on the owners' manual may be difficult to find or may become displaced. After the initial use, a vehicle owner may wish to access the training information again if, for example, the vehicle is sold or moved to a new residence. If a user needs to access the training information again and cannot easily find the machine-readable optical image, accessing the training information may be difficult.

SUMMARY

According to an aspect, a trainable transceiver may comprise an electro-optic element comprising: a first substrate having a first and a second surface; a second substrate generally parallel to and in a spaced-apart relationship with the first substrate, the second substrate having a third and a fourth surface; a first electrode coating associated with the second surface of the first substrate; a second electrode coating associated with the third surface of the second substrate; and a window in at least one of the first substrate and the second substrate from which the associated electrode coating has been at least partially removed. The trainable transceiver may further comprise a machine-readable optical image located adjacent the fourth surface of the second substrate and selectively visible from the first surface through the window; a light source disposed in proximity to the machine-readable optical image; a controller capable of controlling the light source; and a user interface in communication with the controller. Upon receipt of an appropriate input from the user interface, the controller may cause the activation of the light source. Upon the activation of the light source, the machine-readable optical image may be visible through the window in the electro-optic element.

The machine-readable optical image may be configured to allow, upon being scanned, a user to access information. The information may comprise information on training the trainable transceiver. The machine-readable optical image may be a QR code. The machine-readable optical image may be located at least coextensively with the window. The electro-optic element may be supported within a housing. The appropriate input may comprise activation of a user input element that may be in an untrained state.

According to another aspect, a trainable transceiver may comprise: an electro-optic element comprising a first substrate having a first and a second surface; a second substrate generally parallel to and in a spaced-apart relationship with the first substrate, the second substrate having a third and a fourth surface; a first electrode coating associated with the second surface of the first substrate; a second electrode coating associated with the third surface of the second substrate; and a window in at least one of the first substrate and the second substrate from which the associated electrode coating has been at least partially removed. The trainable transceiver may further comprise a light source disposed in optical communication with the window; a controller in communication with the light source; a user interface in communication with the controller; a housing defining an interior cavity and supporting the electro-optic element; and a near field communication tag disposed within the interior cavity. Upon receipt of an appropriate input from the user interface, the controller may cause the light source to become illuminated.

The window may be configured to form the shape of an icon. The icon may provide an indication of the location of the near field communication tag. The near field communication tag may be capable of directing a mobile communications device to vehicle-specific information regarding the trainable transceiver. The appropriate input may comprise the activation of a user input element that may be in an untrained state.

According to another aspect, a method of accessing trainable transceiver information may comprise: causing the appearance, upon the receipt of an input to a user interface associated with the trainable transceiver, of a machine-readable optical image; scanning, by a mobile communications device, the machine-readable optical image; directing, by the machine-readable optical image, the mobile communications device to an internet site containing trainable transceiver-specific information; and accessing, via the mobile communications device, the information. The trainable transceiver-specific information may comprise information on training the trainable transceiver. The machine-readable optical image appears on an electro-optic element of the trainable transceiver.

According to another aspect, a method of accessing trainable transceiver-specific information may comprise: causing the appearance, upon the receipt of an input to a user interface associated with a trainable transceiver, of an indicator indicating the location of a near field communication tag within a trainable transceiver; sensing the near field communication tag by a mobile communications device in proximity to the near field communication tag; directing, by the near field communication tag, the mobile communications device to an internet site containing vehicle-specific information; and accessing, via the mobile communications device, the vehicle-specific information. The trainable transceiver-specific information may comprise information on training a trainable transceiver. The input to the user interface may comprise the activation of a user input element in an untrained state.

DETAILED DESCRIPTION

Figure 1:
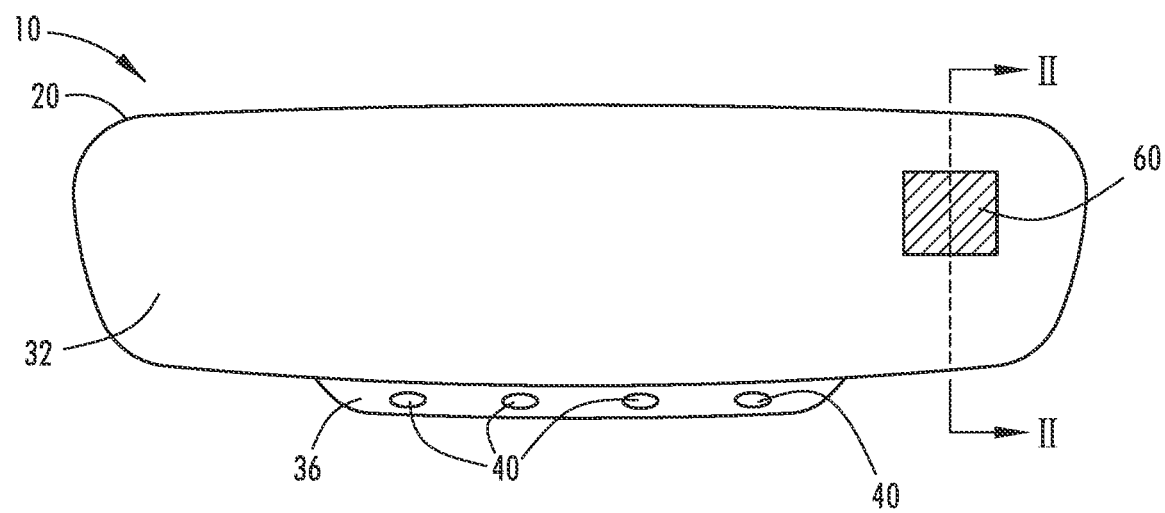
FIG. 1 illustrates a front view of an embodiment of a rearview assembly in accordance with this disclosure.

Vehicle-based trainable transceivers, such as Homelink® trainable transceivers manufactured by Gentex Corporation®, may be used to operate devices outside the vehicle such as moveable barrier systems, thermostats, interior and/or exterior lights, and the like. Trainable transceivers may need to be trained prior to being used. Many users may prefer to be able to train the system by referring to a video and following instructions disclosed therein. Therefore, it may be desirable to have an element, such as a machine-readable optical image or near field communication tag, permanently affixed to the trainable transceiver that allows a user to easily access a training video or other training material such as written instructions. However, when the element is not is use, it may be desirable for it to be hidden.

Referring now to FIGS. 1-6, the trainable transceiver is shown generally at 10. Trainable transceiver 10 may be associated with a rearview assembly 20. When rearview assembly 20 is mounted on a windshield or roof of a vehicle (not shown), rearview assembly 20 may be configured to allow a driver of the vehicle to see objects or scenes behind the vehicle.

Rearview assembly 20 may comprise a housing 24, and housing 24 may define an interior cavity 28. Rearview assembly 20 may further comprise a display element 32. Display element 32 may comprise at least one of a mirror such as a prismatic mirror, an electro-optic element 100, and an electronic display that displays an image as sensed by a rearward facing camera or other imaging system. Housing 24 may be configured to support display element 32.

Trainable transceiver 10 may comprise a user interface 36. In some embodiments, user interface 36 may be disposed on rearview assembly 20. User interface 36 may be in communication with a controller 44. User interface 36 may comprise at least one user input element 40 such as a button, switch, capacitive touch sensor, or the like. Each of the at least one user input elements 40 may be capable of being trained to operate particular devices. However, prior to being trained, each user input element 40 may be in an untrained state.

Figure 2:
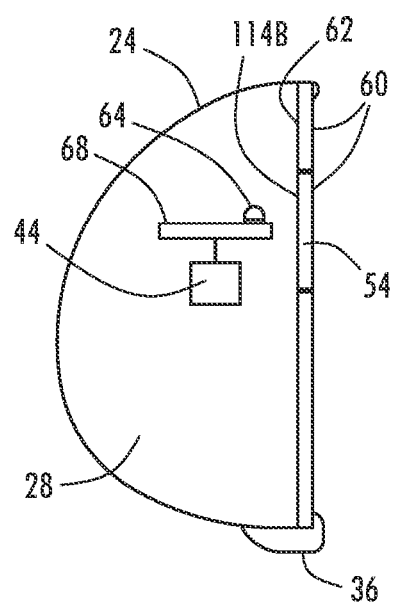
FIG. 2 illustrates a cross-sectional view of the rearview assembly of FIG. 1 along line II-II.
Figure 3:
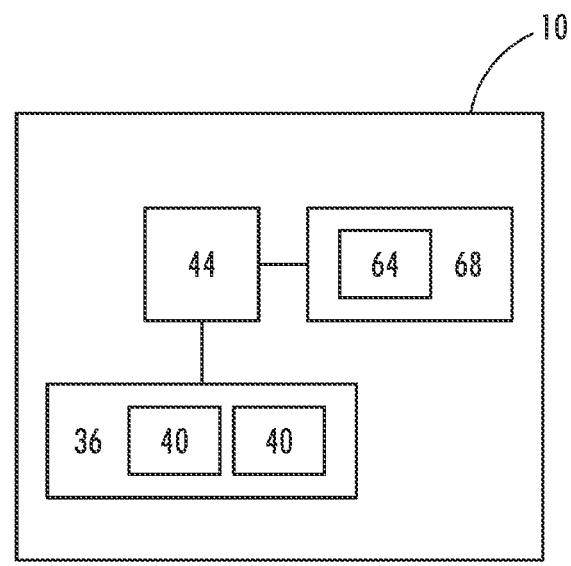
FIG. 3 illustrates a schematic diagram of the rearview assembly of FIG. 1.

In some embodiments, as shown in FIGS. 1-3, trainable transceiver 10 may comprise a machine-readable optical image 52 such as a quick response (QR) code, a bar code, or other machine-readable graphic. Machine-readable optical image 52 may comprise an element that allows a user to easily access training information and/or a training video. The training information and/or video may be accessed by scanning the machine-readable optical image 52 with a mobile communications device 56 such as a smart phone, tablet computer, or other device capable of scanning a machine-readable optical image 52. Upon being scanned by a mobile communications device 56, machine-readable optical image 52 may direct mobile communications device 56 to a website having training information and/or training video. Additionally, or alternatively, upon being scanned, machine-readable optical image 52 may download the training information and/or training video directly to mobile communications device 56 or may download and execute code on mobile communications device.

In some embodiments, machine-readable optical image 52 may be disposed in rearview assembly 20. In some embodiments, machine-readable optical image 52 may be disposed in a vehicle center stack (not shown). For example, machine-readable optical image 52 may be disposed behind display element 32 of rearview assembly 20 or behind a display screen of the center stack of the vehicle. A window 54 may be disposed in display element 32 or display screen. In some embodiments, window 54 may be transflective; i.e., partially reflective and partially transparent, thereby allowing machine-readable optical image 52 to be selectively visible through window 54. When not visible, window may be generally not observable. Machine-readable optical image 52 may be selectively visible through window 54 of display element 32 or display screen. For example, machine-readable optical image 52 may be selectively illuminated and/or backlit and, upon being illuminated or backlit, may be visible through the mirror, electro-optic element 100, or display screen.

In some embodiments, machine-readable optical image 52 may be printed directly on a surface of mirror or electro-optic element 100 of rearview assembly 20 behind a transparent or transflective layer.

In some embodiments, machine-readable optical image 52 may be on an appliqué layer 60 adhered to a surface 62 of display element 32. Surface 62 may be behind a transparent or transflective portion. Appliqué layer 60 may have machine-readable optical image 52 printed on it. Applique layer 60 may not appear to a user unless it is illuminated from behind, at which point machine-readable optical image 52 may become visible to a user.

In some embodiments, a light source 64 may be disposed in interior cavity 28 of housing 24. Light source 64 may be disposed on and/or associated with a printed circuit board 68. Light source 64 may include an LED, an OLED, an incandescent source, an electroluminescent source, a fluorescent source or another appropriately chosen light source 64. Light source 64 may be selectively activated upon the receipt of a particular input or the occurrence of a particular event. Light source 64 may be positioned so that, when illuminated, light source 64 may illuminate or provide backlight for machine-readable optical image 52.

Controller 44 may be in communication with light source 64, as shown in FIG. 3, and may be configured to selectively cause the illumination of light source 64 upon the receipt of an appropriate input, such as an input from user interface 36. The input may comprise the activation of an untrained user input element 40 on user interface 36. Light source 64 may be configured to be used as a backlight for machine-readable optical image 52. When illuminated, light source 64 may be capable of illuminating machine-readable optical image 52, thereby causing it to be visible through display element 32.

Once machine-readable optical image 52 has been illuminated, it may be scanned with a mobile communications device 56 such as a smart phone or with another device capable of scanning a machine-readable optical image 52. In some embodiments, upon scanning machine-readable optical image 52, mobile communications device 56 may be directed to a website or other location to access information such as instructions, video, and/or tutorials for training trainable transceiver 10. In some embodiments, the machine-readable optical image 52 may cause the instructions and/or video to be downloaded to or to be accessible directly through mobile communications device 56 or other device.

In some embodiments, upon scanning the machine-readable optical image 52, information, such as training instructions for trainable transceiver 10, may appear on the mobile communications device 56. The training instructions may be vehicle-specific and/or may be the training instructions for the particular trainable transceiver 10.

In some embodiments, upon scanning machine-readable optical image 52, mobile communications device 56 may download and execute code on mobile communications device 56. In some embodiments, the machine-readable optical image 52 may cause the instructions and/or video to be downloaded to or to be accessible directly through mobile communications device 56 or other device. In some embodiments, upon scanning the machine-readable optical image 52, information may appear on the mobile communications device 56. The instructions may be vehicle-specific and/or may be the instructions for the particular trainable transceiver 10.

Figure 4:
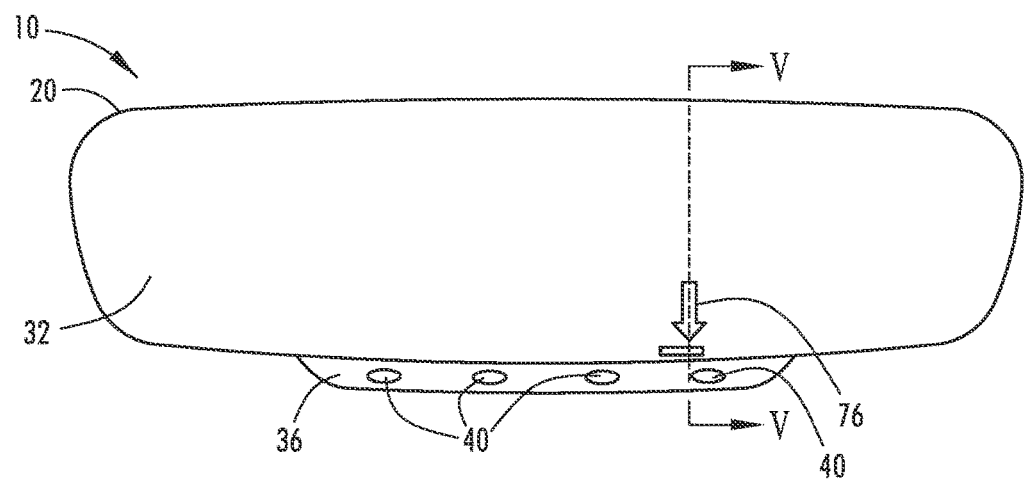
FIG. 4 illustrates a front view of another embodiment of a rearview assembly in accordance with this disclosure.
Figure 5:
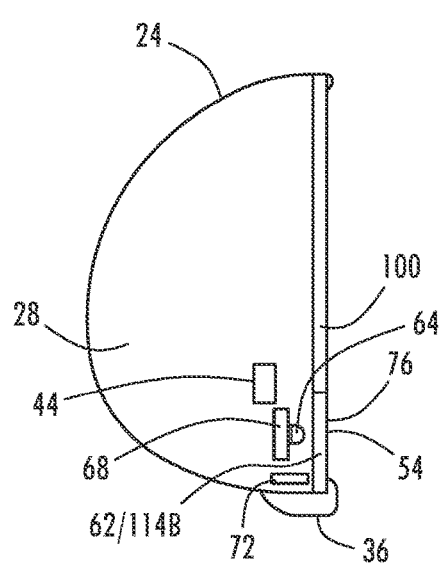
FIG. 5 illustrates a cross-sectional view of the rearview assembly of FIG. 4 along line III-III.
Figure 6:
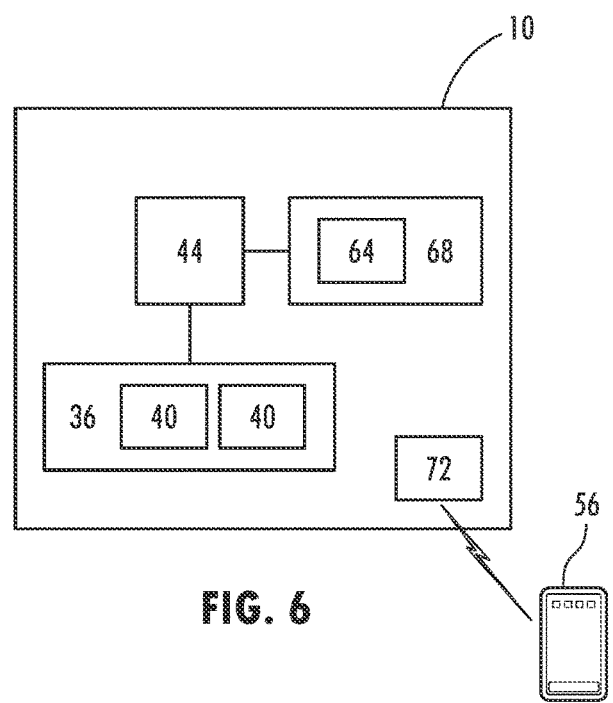
FIG. 6 illustrates a schematic diagram of the rearview assembly of FIG. 4.

In some embodiments, as shown in FIGS. 4-6, a near field communication (NFC) tag 72 may be disposed in interior cavity 28 of housing 24. In some embodiments, NFC tag 72 may be disposed behind the display screen of the vehicle center stack (not shown). Upon the placement of a device capable of reading NFC tag 72, such as a mobile communications device 56, in proximity to NFC tag 72 such that the device is capable of reading NFC tag 72, NFC tag 72 may direct the device to the appropriate training information, such as a tutorial or a training video detailing how to train the particular trainable transceiver 10.

In some embodiments, an indicator 76 such as a directional icon to enable the user to more easily locate the NFC tag 72 may be selectively visible on display element 32 of rearview assembly 20 or the display screen of the vehicle center stack. Indicator 76 may be configured to indicate to the user a location of NFC tag 72. In embodiments in which display element 32 is a liquid crystal display, the indicator 76 may appear directly on display element 32. In configurations in which display element 32 is a mirror or an electro-optic element 100, an indicator 76 may be formed in a reflective coating (including chromium or silver, for example) disposed on one of the surfaces of the display element 32. Indicator 76 may be formed by, for example, appropriately removing a portion of such coating such as to create a textual or graphical indicator 76.

Indicator 76 may be illuminated with light from light source 64 disposed within rearview assembly 20. Light source 64 may be capable of selectively illuminating indicator 76. In some embodiments, light source 64 may be disposed on printed circuit board 68. Light emitted by light source 64 may pass through indicator 76 to allow indicator 76 to be visible through display element 32 of trainable transceiver 10.

Light source 64 may be illuminated upon the occurrence of a particular event such as the receipt of an input on user interface 36 or the activation of an untrained user input element 40. Indicator 76 may indicate to a user where mobile communications device 56 should be placed in order to communicate with the NFC tag 72.

Indicator 76 may be formed in a variety of ways known to those in the art. For example, one or more layers of a partially reflective partially transmissive electrode material 118, 120 may be partially removed from a surface of an electro-optic element 100 to permit a display to show through to the driver of the vehicle. In another example, one or more layers of a reflective material (not shown) may be removed from a surface of a mirror.

In some embodiments, once in proximity with the NFC tag 72, mobile communications device 56 may be directed, by the NFC tag 72, to a website or other location having information such as training information, tutorials, or videos for training trainable transceiver 10. The information may be vehicle-specific training information or training information specific to the particular trainable transceiver 10. In some embodiments, once in proximity with NFC tag 72, mobile communications device may download and execute code on mobile communications device 56. Using an NFC tag 72 may allow a user to have improved Bluetooth pairing or WIFI connection for accessing the information. The network SSID and password may be stored in the NFC tag 72 for more secure access and to avoid the possibility of linking to a malware site.

Figure 7:
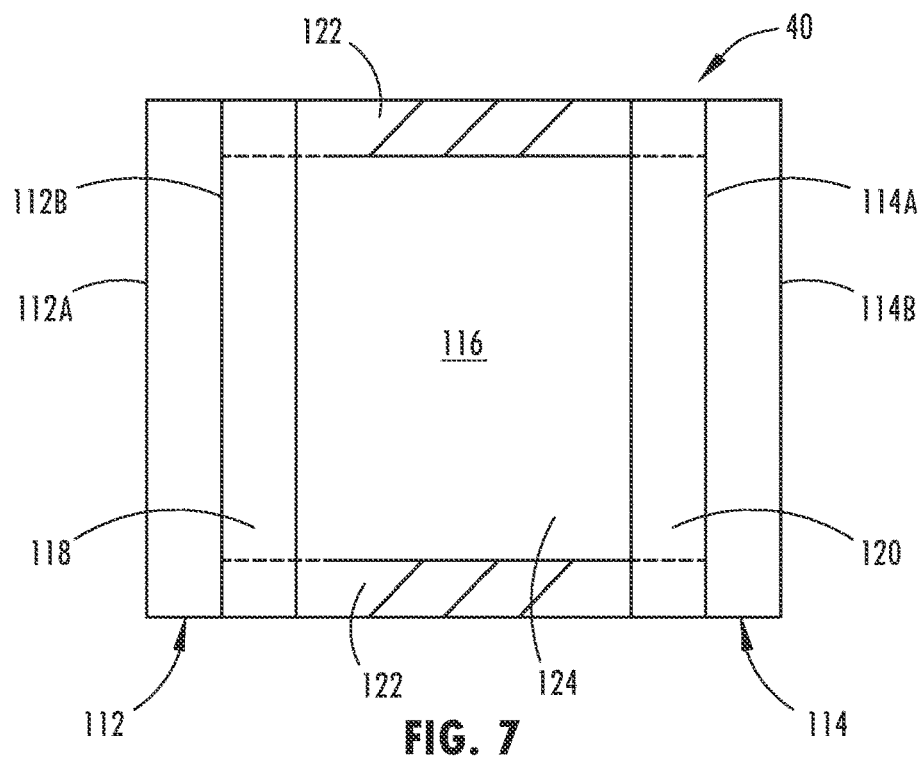
FIG. 7 illustrates a diagram of an electro-optic element.

Electro-optic element 100 may generally comprise a first substrate 112 having a first surface 112A and a second surface 112B, and a second substrate 114 having a third surface 114A and a fourth surface 114B as shown in FIG. 7. First and second substrates 112, 114 may be in a spaced-apart relationship with one another. A sealing member 122 may extend between first and second substrates 112, 114 along at least a portion of a perimeter of electro-optic element 100. A chamber 116 for containing electro-optic medium 124 may be defined by second surface 112B of first substrate 112, the opposed third surface 114A of second substrate 114, and sealing member 122. As shown in the figures, first substrate 112 may be closer to the viewer than second substrate 114.

One or more first layers of a first electrically conductive material or electrode coatings 118 may be associated with second surface 112B of first substrate 112. These layers may serve as a first electrode for electro-optic element 100. First electrode coating 118 may be a material that is substantially transparent in the visible region of the electromagnetic spectrum. First electrode coating 118 may be fabricated from fluorine doped tin oxide (FTO), indium/tin oxide (ITO), doped zinc oxide or other materials known to those having ordinary skill in the art.

Similarly, one or more layers of a second electrically conductive material or electrode coatings 120 may be associated with and disposed on third surface 114A of second substrate 114 and may operate as a second electrode for electro-optic element 100. Second electrode coating 120 may act as both a reflector and an electrode. Second electrode coating 120 may comprise a single layer or multiple layers. In some embodiments, second electrode coating 120 may be partially reflective and partially transmissive.

Figure 8:
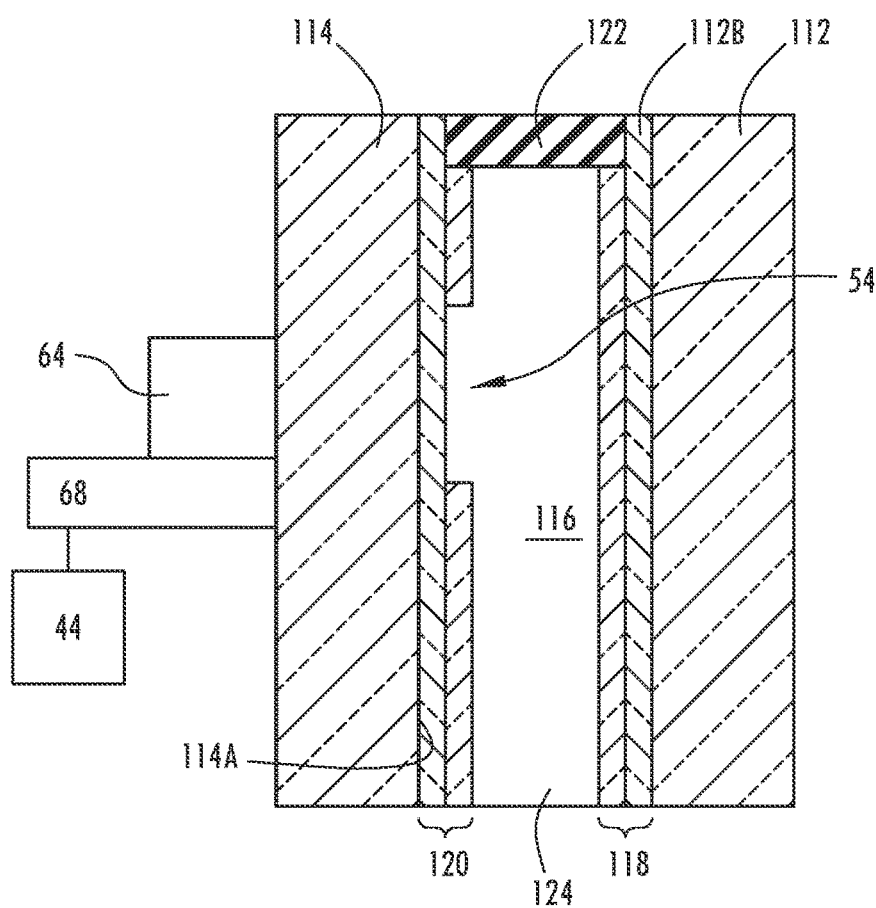
FIG. 8 illustrates a window in a display element of a rearview assembly.

Window 54 may be made by removing a portion of one or more layers of first and/or second electrode coating 118, 120 from the associated substrate as shown in FIG. 8. Machine-readable optical image 52 may be disposed adjacent to fourth surface 114B of electro-optic element 100 and generally coextensive with window 54. Machine-readable optical image 52 may be visible through windows 54. This may allow electro-optic element 100 to appear as a contiguous reflector when machine-readable optical image 52 is not illuminated.

Various constructions for electro-optic elements 100 with a light source 64 positioned within rearview assembly 20 are known in the art. For example, electro-optic element 100 may be constructed as described above except where second electrode coating 120 includes window 54 in proximity to light source 64. Second electrode coating 120 is preferably at least partially transmissive so as to enable light emitted from light source 64 to be transmitted through electro-optic element 100 via window 54. Second electrode coating 120 may comprise a single layer of a conductive material. Window 54 in second electrode coating 120 may be formed by masking window area 54 during the application of the reflective material, by etching, by ablating undesired areas of second electrode coating 120, or by other means known in the art.

In some embodiments, display element 32 may include an electronic display that displays an image as sensed by a rearward facing camera or other imaging system and transmitted to display element 32 (see, for example, commonly assigned U.S. Pat. No. 6,550,949 entitled "SYSTEMS AND COMPONENTS FOR ENHANCING REAR VISION FROM A VEHICLE," filed on Sep. 15, 1998, by Frederick T. Bauer et al., the entire disclosure of which is incorporated herein by reference). Electronic display may comprise, for example, a liquid crystal display. Additionally or alternatively, display element 32 may comprise both a rearview assembly 20 having an electro-optic element 100 and a display device for providing an image from a rearward facing camera or other imaging system. Display element 32 may be configured to selectively display machine-readable optical image 52 upon receipt of an appropriate input. Information may be displayed on machine-readable optical image 52 when the light source 64 is illuminated and backlights machine-readable optical image 52.

Figure 9:
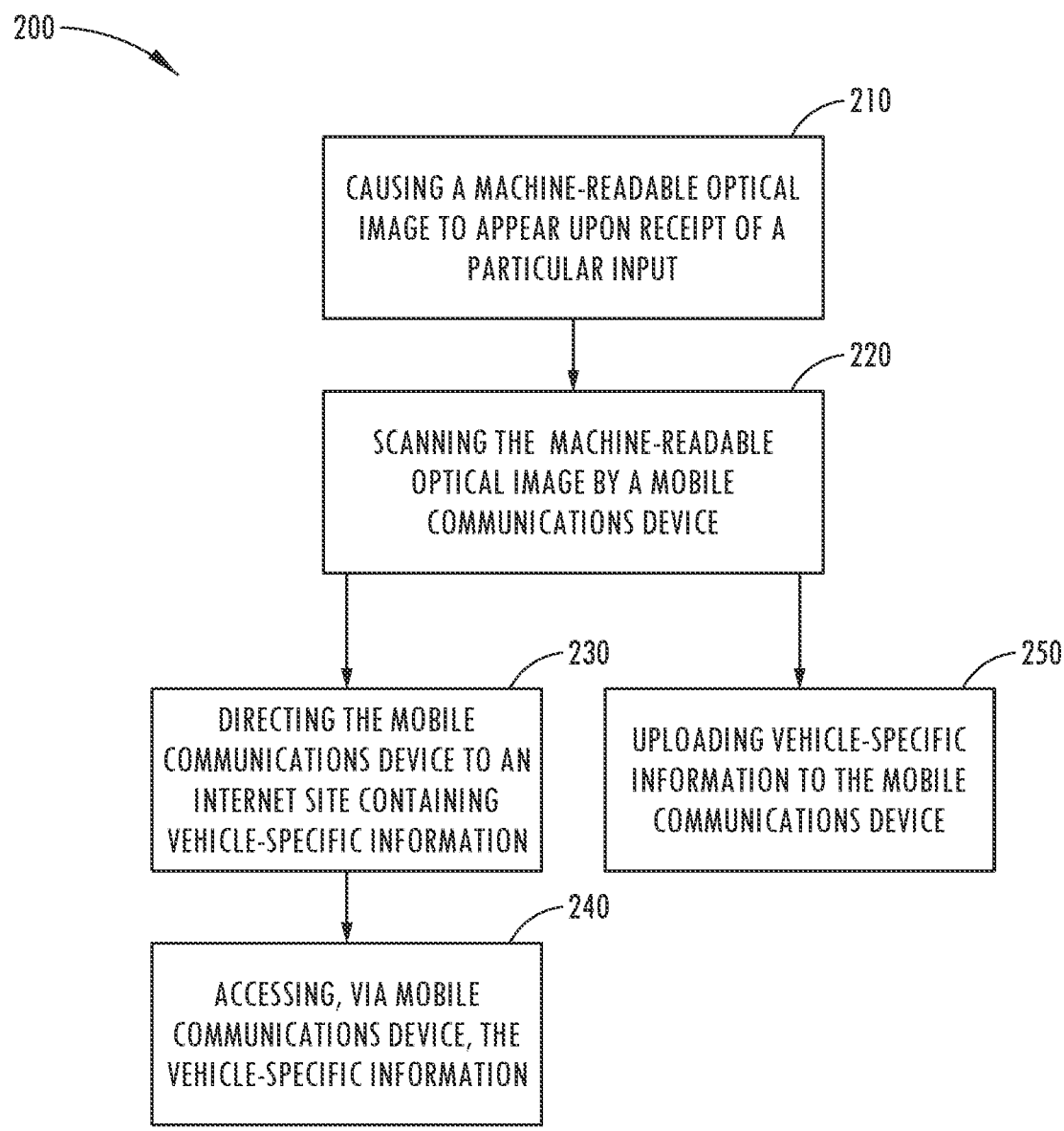
FIG. 9 illustrates a flow chart for a first method of accessing vehicle-specific training information for a trainable transceiver.

In some embodiments, as shown in FIG. 9, a method 200 of accessing vehicle-specific information, such as information for training a trainable transceiver 10, may comprise causing machine-readable optical image 52 to appear upon the receipt of a particular input at step 210. The particular input may comprise, for example, an input to user interface 36 associated with trainable transceiver 10 or the activation of an untrained user input element 40. In step 220, the method may further comprise scanning machine-readable optical image 52 by mobile communications device 56. In some embodiments, in step 230, the method may further comprise directing, through scanned machine-readable optical image 52, mobile communications device 56 to an internet site containing vehicle specific information and, in step 240, accessing, via mobile communications device 56, the vehicle specific information. Additionally, or alternatively, in some embodiments, in step 250, the method may further comprise uploading vehicle specific information to mobile communications device 56. The vehicle-specific information may comprise information on training trainable transceiver 10. Machine-readable optical image 52 may appear on transflective display element 32 of trainable transceiver 10.

Figure 10:
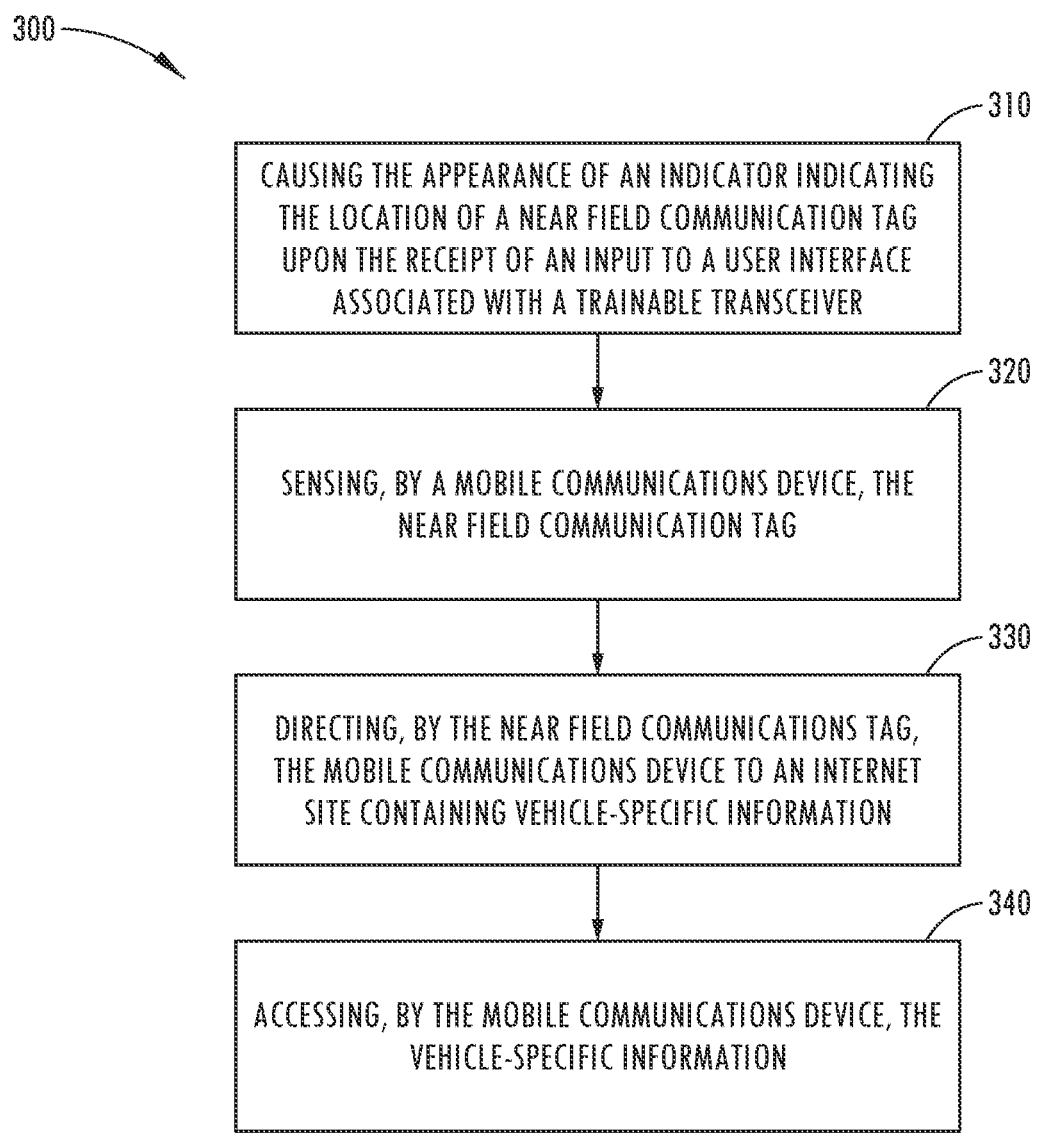
FIG. 10 illustrates a flow chart for a second method of accessing vehicle-specific training information for a trainable transceiver.

In some embodiments, as shown in FIG. 10, a method 300 of accessing vehicle-specific information may comprise, in step 310, causing the appearance of an indicator 76 indicating the location of NFC tag upon the occurrence of a particular event. The particular event may comprise, for example, the receipt of an input to a user interface 36 associated with a trainable transceiver 10 or the activation of an untrained user input element 40. In step 320, once in proximity to NFC tag 72, mobile communications device 56 may sense NFC tag. In step 330, NFC tag may direct mobile communications device 56 to an internet site containing vehicle-specific information. In step 340, mobile communications device 56 may access the vehicle-specific information. The vehicle-specific information may comprise information on training the particular trainable transceiver 10. NFC tag may be disposed within interior cavity 28 of housing 24 of trainable transceiver 10.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A trainable transceiver, comprising:
   an electro-optic element comprising:
   a first substrate having a first and a second surface;
   a second substrate generally parallel to and in a spaced-apart relationship with the first substrate, the second substrate having a third and a fourth surface;
   a first electrode coating associated with the second surface of the first substrate;
   a second electrode coating associated with the third surface of the second substrate; and
   a window on at least one of the second surface of the first substrate and the third surface of the second substrate from which the associated electrode coating has been at least partially removed;
   a machine-readable optical image located adjacent the fourth surface of the second substrate and selectively visible from the first surface through the window;
   a controller capable of controlling the light source; and
   a user interface in communication with the controller.

2. The trainable transceiver of claim 1, further comprising a light source disposed in proximity to the machine-readable optical image;
   wherein, upon receipt of an appropriate input from the user interface, the controller causes the activation of the light source; and
   wherein, upon the activation of the light source, the machine-readable optical image is visible through the electro-optic element.

3. The trainable transceiver of claim 1, wherein the appropriate input comprises activation of a user input element that is in an untrained state.

4. The trainable transceiver of claim 1, wherein the machine-readable optical image is configured to allow, upon being scanned, a user to access information.

5. The trainable transceiver of claim 4, wherein the information comprises information on training the trainable transceiver.

6. The trainable transceiver of claim 1, wherein the machine-readable optical image is a QR code.

7. The trainable transceiver of claim 1, wherein the machine-readable optical image is disposed to be at least partially coextensive with the window.

8. The trainable transceiver of claim 1, wherein the electro-optic element is supported within a housing.

9. A trainable transceiver, comprising:
   an electro-optic element comprising,
   a first substrate having a first and a second surface;
   a second substrate generally parallel to and in a spaced-apart relationship with the first substrate, the second substrate having a third and a fourth surface;
   a first electrode coating associated with the second surface of the first substrate;
   a second electrode coating associated with the third surface of the second substrate; and
   a window in at least one of the second surface of the first substrate and the third surface of the second substrate from which the associated electrode coating has been at least partially removed;
   a light source disposed in optical communication with the window;
   a controller in communication with the light source;
   a user interface in communication with the controller;
   a housing defining an interior cavity and supporting the electro-optic element; and
   a near field communication tag disposed within the interior cavity;
   wherein, upon receipt of an appropriate input from the user interface, the controller causes the light source to become illuminated.

10. The trainable transceiver of claim 9, wherein the window forms the shape of an icon.

11. The trainable transceiver of claim 10, wherein the icon provides an indication of the location of the near field communication tag.

12. The trainable transceiver of claim 9, wherein the near field communication tag is capable of directing a mobile communications device to vehicle-specific information regarding the trainable transceiver.

13. The trainable transceiver of claim 9, wherein the appropriate input comprises activation of a user input element that is in an untrained state.

14. A method of accessing trainable transceiver-specific information, comprising:
- causing the appearance, upon the receipt of an input to a user interface associated with a trainable transceiver, of an indicator indicating the location of a near field communication tag within a trainable transceiver;
- sensing the near field communication tag by a mobile communications device in proximity to the near field communication tag;
- directing, by the near field communication tag, the mobile communications device to an internet site containing vehicle-specific information; and
- accessing, via the mobile communications device, the vehicle-specific information.

15. The method of claim 14, wherein the trainable transceiver-specific information comprises information on training a trainable transceiver.

16. The method of claim 14, wherein the input to the user interface comprises the activation of a user input element in an untrained state.

* * * * *